(12) United States Patent
Inoue

(10) Patent No.: US 9,443,546 B2
(45) Date of Patent: *Sep. 13, 2016

(54) MAGNETIC TAPE AND METHOD FOR PRODUCING THE SAME

(71) Applicant: Hitachi Maxell, Ltd., Osaka (JP)

(72) Inventor: Tetsutaro Inoue, Osaka (JP)

(73) Assignee: HITACHI MAXELL, LTD., Ibaraki-Shi, Osaka (JP)

(*) Notice: Subject to any disclaimer, the term of this patent is extended or adjusted under 35 U.S.C. 154(b) by 230 days.

This patent is subject to a terminal disclaimer.

(21) Appl. No.: 14/147,339

(22) Filed: Jan. 3, 2014

(65) Prior Publication Data

US 2014/0120376 A1 May 1, 2014

Related U.S. Application Data

(62) Division of application No. 13/457,037, filed on Apr. 26, 2012, now Pat. No. 8,647,756, which is a division of application No. 12/535,367, filed on Aug. 4, 2009, now Pat. No. 8,349,475.

(30) Foreign Application Priority Data

Aug. 5, 2008 (JP) ................................. 2008-201392

(51) Int. Cl.
| | |
|---|---|
| *G11B 5/70* | (2006.01) |
| *G11B 5/78* | (2006.01) |
| *B26D 1/24* | (2006.01) |
| *G11B 5/702* | (2006.01) |
| *G11B 5/84* | (2006.01) |

(Continued)

(52) U.S. Cl.
CPC .............. *G11B 5/78* (2013.01); *B26D 1/245* (2013.01); *B26D 7/2635* (2013.01); *G11B 5/70* (2013.01); *G11B 5/7026* (2013.01); *G11B 5/84* (2013.01); *B26D 7/2621* (2013.01); *B26D 2001/0033* (2013.01); *B26D 2007/2685* (2013.01); *Y10T 83/0419* (2015.04); *Y10T 83/0605* (2015.04)

(58) Field of Classification Search
None
See application file for complete search history.

(56) References Cited

U.S. PATENT DOCUMENTS

| | | | |
|---|---|---|---|
| 5,164,243 | A | 11/1992 | Kanazawa et al. |
| 5,827,599 | A | 10/1998 | Murao et al. |
| 6,013,220 | A | 1/2000 | Iwasaki |

(Continued)

FOREIGN PATENT DOCUMENTS

| | | |
|---|---|---|
| JP | 4-3310 A | 1/1992 |
| JP | 9-153212 A | 6/1997 |

(Continued)

OTHER PUBLICATIONS

JPO Office Action, issued Jun. 16, 2009, for JP-2008-201392.

(Continued)

*Primary Examiner* — Kevin Bernatz
(74) *Attorney, Agent, or Firm* — Birch, Stewart, Kolasch & Birch, LLP

(57) ABSTRACT

A magnetic tape produced by cutting a magnetic sheet with a wide breadth into a tape having a predetermined width using a cutting device, in which the magnetic sheet has a magnetic layer containing magnetic powder and a binder formed on one surface of a non-magnetic substrate having a thickness of 4 μm or less, and a center line average height (Ra) along a roughness curve of a cut edge of the magnetic tape is from 0.08 to 0.25 μm.

4 Claims, 4 Drawing Sheets

(51) Int. Cl.
  *B26D 7/26* (2006.01)
  *B26D 1/00* (2006.01)

(56) References Cited

U.S. PATENT DOCUMENTS

| | | |
|---|---|---|
| 7,381,485 B2 | 6/2008 | Ishikawa et al. |
| 8,349,475 B2 * | 1/2013 | Inoue .................... B26D 1/245 360/134 |
| 8,647,756 B2 * | 2/2014 | Inoue .................... B26D 1/245 360/134 |
| 2001/0009726 A1 | 7/2001 | Iida et al. |
| 2002/0181382 A1 | 12/2002 | Oakley |
| 2003/0098386 A1 | 5/2003 | Hashimoto |
| 2004/0021024 A1 | 2/2004 | Yoshimura et al. |
| 2004/0110037 A1 | 6/2004 | Kuse et al. |
| 2004/0173069 A1 | 9/2004 | Shoudai et al. |
| 2005/0153170 A1 | 7/2005 | Inoue et al. |
| 2005/0202289 A1 | 9/2005 | Ishikawa et al. |
| 2005/0214525 A1 | 9/2005 | Ohno |
| 2006/0003191 A1 | 1/2006 | Kuse et al. |
| 2006/0166041 A1 | 7/2006 | Takeda et al. |
| 2007/0009769 A1 | 1/2007 | Kanazawa |
| 2007/0242331 A1 | 10/2007 | Plourde et al. |

FOREIGN PATENT DOCUMENTS

| | | |
|---|---|---|
| JP | 2005-222602 A | 8/2005 |
| JP | 2005-241293 A | 9/2005 |

OTHER PUBLICATIONS

Nakao et al., Translation JP 2005-241293, Aug. 2005.
Translation of JP-2005-241293-A (published Sep. 8, 2005), Satoshi et al.

* cited by examiner

MAGNETIC TAPE AND METHOD FOR PRODUCING THE SAME

The present application is a Divisional of copending U.S. application Ser. No. 13/457,037, filed Apr. 26, 2012, which is a Divisional of Application No. 12/535,367, filed Aug. 4, 2009, which claims the benefit of priority from Japanese Patent Application No. 2008-201392, filed on Aug. 5, 2008. The entire contents of all of the above applications are hereby incorporated by reference.

FIELD OF THE INVENTION

The present invention relates to a coating type magnetic tape and a method for producing the same. Particularly, the present invention relates to a magnetic tape suitable for use with a linear serpentine type magnetic recording-reproducing system.

BACKGROUND ART

In general, a magnetic tape which is a coating type magnetic recording medium is produced as follows: a magnetic sheet with a wide breadth is prepared by coating one surface of a non-magnetic substrate with a magnetic coating composition comprising a dispersion of magnetic powder, a binder and optionally other additive(s) in a solvent; drying this coating composition to form a magnetic layer thereon; coating the other surface of the non-magnetic substrate with a coating composition for a backcoat layer comprising a dispersion of a pigment such as carbon black, a binder and optionally other additive(s) in a solvent; and drying this coating composition to form a backcoat layer; and this magnetic sheet is slit into tapes with predetermined widths in a cutting step.

Recording-reproducing systems with the use of magnetic tapes are roughly classified to a helical scan type using a rotatable magnetic head and a linear serpentine type using a stationary magnetic head. The recording-reproducing systems of these types have their own advantages, respectively. However, the recording-reproducing systems of the latter type, i.e., the linear serpentine type, have come into wide practical use as the recording-reproducing systems with the use of backup tapes, because a touching condition between the magnetic head and a magnetic tape is gentle, and because restriction in the volume of a magnetic tape cartridge is mild. As such commercial products, for example, Digital Linear Tape (or DLT) and Linear Tape-Open (or LTO) have been put on the market.

Mass storage magnetic tapes for backup are indispensable to correspond to hard discs of which the storage is increasing year after year. To increase the storage capacity of a magnetic tape, it is necessary to increase its recording area, in other words, to increase the length of the magnetic tape per reel by decreasing the total thickness of the magnetic tape. In this regard, the component which occupies the largest proportion of the volume of the entire magnetic tape is a non-magnetic substrate, and therefore, it is effective to decrease the thickness of the non-magnetic substrate so as to increase the length of the magnetic tape per reel. In the above-described DLT and LTO, a polyethylene terephthalate (PET) film or a polyethylene naphthalate (PEN) film having a thickness of from 5 to 6 μm and higher strength in its lengthwise direction is used as a non-magnetic substrate. However, from the viewpoint of mass storage, it is necessary to use a non-magnetic substrate with a far thinner thickness of 4 μm or less: for example, a backup tape comprising a non-magnetic substrate with a thickness of from 2 to 3 μm is proposed (cf. JP-A-10-134337).

In the linear serpentine type magnetic recording-reproducing system, generally, a plurality of tracks are formed on the magnetic layer along the lengthwise direction. When recording or reproducing of signals is performed on the magnetic tape, the magnetic head is moved across one track from one edge to the other edge of the track in the widthwise direction. To prevent off-track of the magnetic head, it is necessary to ensure the linear running performance of the magnetic tape fed at a high speed. Therefore, a plurality of guide rollers having flange portions are provided between the magnetic tape cartridge and the take-up reel in the magnetic recording-reproducing system. However, this leads to the following disadvantage: when the cut edges of the magnetic tape frictionally touch the flange portions of the guide rollers during the feeding of the magnetic tape, decrease in the strength of the magnetic tape is unavoidable because of the thinner non-magnetic substrate, since the flexural rigidity of the magnetic tape tends to decrease in proportion to the cube of its thickness. As a result, when the cut edges of the magnetic tape frictionally touch the flange portions of the guide rollers during the feeding of the magnetic tape, the magnetic tape is apt to deform, which makes it hard to ensure the linear running performance of the magnetic tape which is passing on the guide rollers. There is another problem: when the thickness of the non-magnetic substrate decreases, the cutting property of the magnetic sheet is reduced to degrade the smoothness of the cut edges of the magnetic tape. When the magnetic tape obtained from such a magnetic sheet is fed in the magnetic recording-reproducing system described above, a part of one of the cut edges of the magnetic tape is likely to strike the flange portions of the guide rollers, with the result that the magnetic layer or the backcoat layer is damaged to cause flaking therefrom.

In a magnetic tape for use with a low-speed helical scan type magnetic recording-reproducing system, JP-B-07-114012 proposes that flaking from a magnetic layer or a backcoat layer of a magnetic tape is suppressed by cutting a magnetic sheet with a laser beam, so that the cut edges of the magnetic layer or the backcoat layer can be positioned backward inwardly, from the cut edges of the non-magnetic substrate, in order to prevent such flaking. However, the following problems still remain: even when a magnetic tape comprising a thin non-magnetic substrate and having such cut edges as described above is fed at a high speed in the linear serpentine type magnetic recording-reproducing system, flaking from the magnetic tape at the guide rollers cannot be sufficiently eliminated, and the linear running performance of the magnetic tape cannot be improved.

SUMMARY OF THE INVENTION

An object of the present invention is to provide a magnetic tape which comprises a far thinner non-magnetic substrate than any of the conventional ones and which shows superior linear running performance while being fed on guide rollers having flange portions at a high speed, with less flaking therefrom, when recording or reproducing of data is performed on this magnetic tape in a linear serpentine type magnetic recording-reproducing system.

Accordingly, the present invention provides a magnetic tape produced by cutting a magnetic sheet with a wide breadth into a tape with a predetermined width using a cutting device, wherein the magnetic sheet comprises a magnetic layer containing magnetic powder and a binder formed on one surface of a non-magnetic substrate having a thickness of 4 μm or less, and wherein a center line average height (Ra) along a roughness curve of a cut edge of the magnetic tape is from 0.08 to 0.25 μm.

According to the magnetic tape of the present invention, the center line average height (Ra) on the cut edge of the magnetic tape is from 0.08 to 0.25 μm, and therefore, the magnetic tape has the advantages, that is, even when recording or reproducing of signals is performed on this magnetic tape in a linear serpentine type magnetic recording-reproducing system, the friction coefficient of the cut edge of the magnetic tape against the flange portions of guide rollers during the high-speed feeding thereof is small, and the striking of one of the cut edges of the magnetic tape against the flange portions is suppressed, so that flaking from the magnetic tape can be reduced, while maintaining the linear running performance of the magnetic tape.

The magnetic tape of the present invention may further comprise a primer layer containing inorganic powder and a binder between the non-magnetic substrate and the magnetic layer. The primer layer, if present, imparts stiffness to the magnetic sheet even though the non-magnetic substrate used therein is thin, so that the cutting property of the magnetic sheet is improved.

Preferably, the binder of the primer layer contains an electron radiation curing resin. The primer layer containing an electron radiation curing resin can further improve the cutting property of the magnetic sheet A magnetic tape obtained from such a magnetic sheet as described above can be advantageously used with a linear serpentine type magnetic recording-reproducing system, because the magnetic tape is excellent in linear running performance and suffers from less flaking therefrom, even when the magnetic tape is fed at a high speed while frictionally touching the guide rollers having flange portions.

The present invention also provides a process for producing the magnetic tape of the present invention, which process is characterized in that a ratio (Ew/Et) of a Young's modulus of a magnetic sheet in the widthwise direction (Ew) to a Young's modulus thereof in a lengthwise direction (Et) is from 0.85 to 1.15; a cutting device comprises a cutting means which has thin blades and thick blades located confronting the thin blades while intermeshing therewith, a feeding means which carries the magnetic sheet to a position between the thin blades and the thick blades, and a take-up means; a intermeshing depth (L) of the thin blades and the thick blades is from 0.05 to 0.1 mm, and the maximum surface roughness (P-V) of each of the side faces of the thin blades and the thick blades intermeshing with each other is 0.05 μm or less; and the magnetic sheet is cut into tapes with predetermined widths, while being so conveyed that fluctuation of the magnetic sheet in the widthwise direction in the proximity of the cutting means is 100 μm or less.

When the magnetic sheet described above and the cutting conditions described above are employed, the fluctuation of the magnetic sheet while being cut becomes smaller, and a shear force from the cutting means can be efficiently applied to the magnetic sheet.

As described above, the present invention can achieve the following effects: even when a magnetic tape which comprises a thin non-magnetic substrate to achieve mass storage is used with a linear serpentine type magnetic recording-reproducing system, the linear running performance of the magnetic tape on the guide rollers can be improved, and flaking from the magnetic tape due to frictional contact with the guide rollers can be reduced.

BRIEF DESCRIPTION OF THE DRAWING

The present invention will be described in detail with reference to the accompanying drawings, wherein.

DESCRIPTION OF REFERENCE NUMERALS

3=a magnetic tape
3a=a magnetic layer
3b=a non-magnetic substrate
3c=a backcoat layer 6=a guide roller
6a=flange portions
10=a cutting means
11=thin blades
11a=side faces of thin blades
12=thick blades
12a=side faces of the thick blades
20=a feeding section
30=a take-up section
L=intermeshing depth
M=a magnetic sheet
S=a cut edge

DETAILED DESCRIPTION OF THE INVENTION

Figure 1:
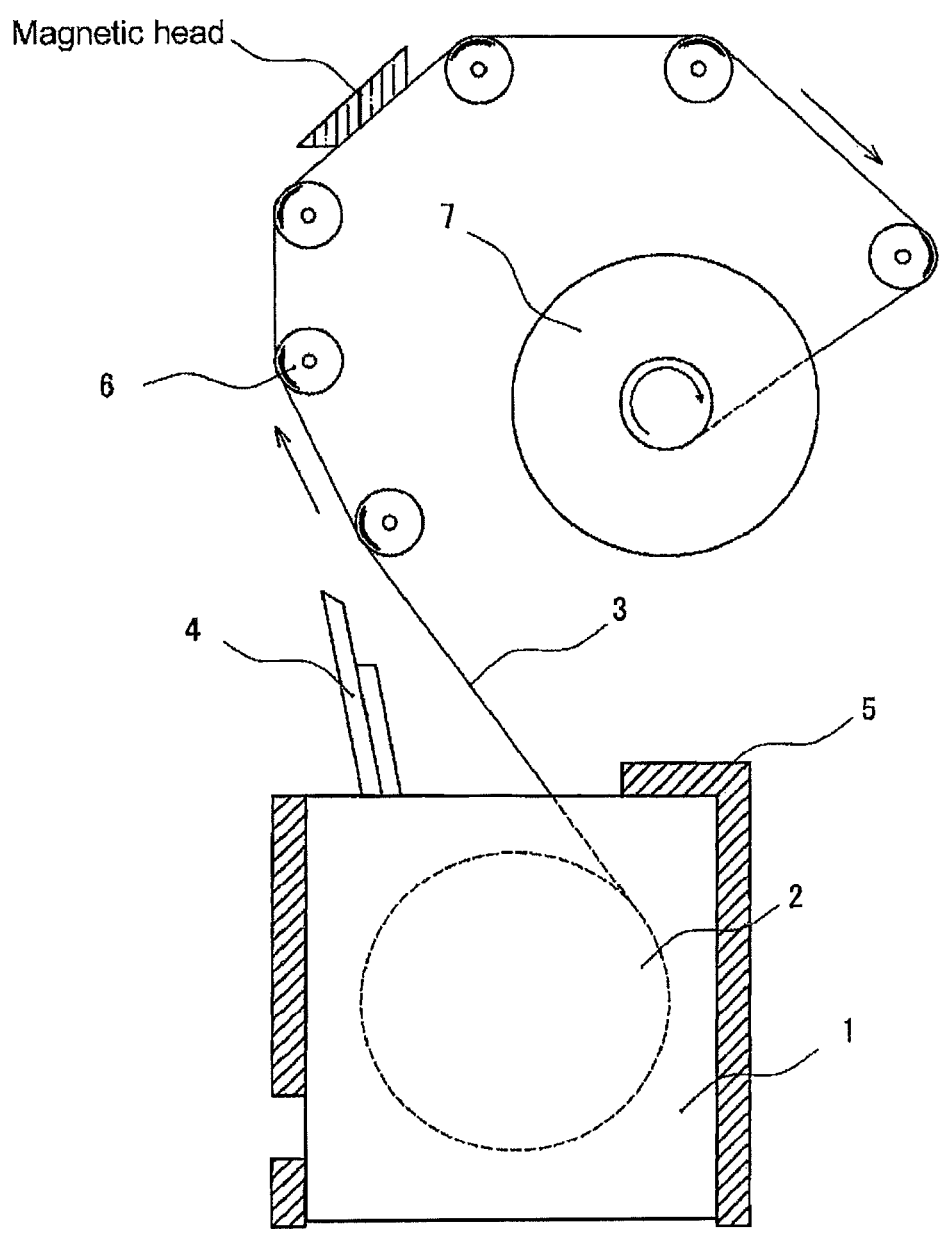
FIG. 1 shows a schematic diagram illustrating an example of a tape-feeding system in a linear serpentine type magnetic recording-reproducing system in which a magnetic tape according to the present invention is used.

FIG. 1 shows the schematic diagram of an example of a tape-feeding system in a linear serpentine type magnetic recording-reproducing system with which a magnetic tape according to an embodiment of the present invention is used. As shown in FIG. 1, the magnetic tape cartridge 1 is a single reel type cartridge in which the magnetic tape 3 is wound onto the single tape reel 2. In this magnetic recording-reproducing system, the door 4 on the front side of the magnetic tape cartridge 1 is opened upon the insertion of the magnetic tape cartridge 1 into the cassette compartment 5 of the magnetic recording-reproducing system, and the magnetic tape 3 is pulled out by a tape-pulling means in the system, through the opened door 4. Then, the pulled magnetic tape 3 is led by a plurality of the guide rollers 6 each having flange portions on the upper and lower sides, and is then wound onto the take-up reel 7.

Figure 2:
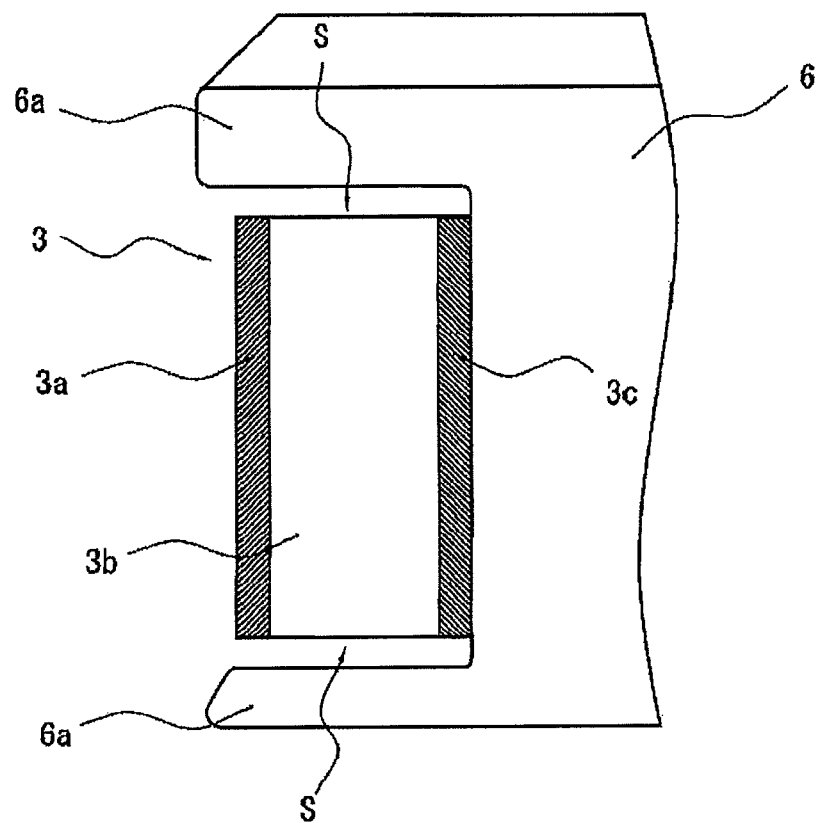
FIG. 2 shows an enlarged view of a part of the tape-feeding system shown in FIG. 1, illustrating the frictional touching state of the magnetic tape to the guide roller.

FIG. 2 shows the schematic sectional view of the guide roller 6, illustrating the frictional touching state of the magnetic tape 3 to the guide roller 6 in the tape-feeding system shown in FIG. 1. In this magnetic recording-reproducing system, the backcoat layer 3c formed on the surface of the non-magnetic substrate 3b which has the magnetic layer 3a formed on the opposite surface thereof comes into contact with the surface of the hub of the guide roller 6. When the magnetic tape 3 is fed at a high speed in this magnetic recording-reproducing system, the magnetic tape 3 tends to move up and down so that the cut edges S of the magnetic tape 3 are likely to frictionally touch the upper and lower flange portions 6a of the guide roller. Therefore, flaking from the magnetic tape 3 containing the thin non-magnetic substrate 3b is apt to occur, or the magnetic tape tends to deform. This may lower the linear running performance of the magnetic tape. Such disadvantages are serious in the linear serpentine type magnetic recording-reproducing system in which a lot of guide rollers 6 are provided to ensure the linear running performance of the magnetic tape 3.

One of factors to cause flaking from the magnetic tape containing the thin non-magnetic substrate is considered to be poor smoothness of the cut edges of the magnetic tape, when the magnetic tape is cut from a magnetic sheet. This is described in detail. When the magnetic sheet is cut, the rigidity of the magnetic sheet tends to lower with a decrease in the thickness of the non-magnetic substrate. Therefore, the magnetic sheet is apt to move when cut, and therefore, the cut edges of the magnetic tape become rough. When the raised portions of one of the rough cut edges of the magnetic tape strike the flange portion of the guide roller, a stress tends to concentrate on the raised portions of the cut edge, resulting in the occurrence of flaking from such portions of the magnetic tape. On the other hand, such concentration of a stress can be avoided if the cut edges are smoothened, while the contact area between the cut edge and the flange portion is increased, which leads to higher friction. As a result, it becomes difficult to ensure the linear running performance of the magnetic tape during the high-speed feeding thereof, if the non-magnetic substrate used is so thin as to be liable to deform due to the frictional contact with the flange portion.

Under such a situation, the present inventors have made studies on such cut edges of a magnetic tape that make it possible to reduce the flaking from the magnetic tape due to the frictional contact with the flange portions, of guide roller and also make it possible to ensure the linear running performance of the magnetic tape on the flange portions of the guide roller. As a result, it has been found that the problems can be solved when the center line average height (Ra) along the roughness curve of the cut edge of the magnetic tape is adjusted to 0.08 to 0.25 µm: that is, under this condition, even if a magnetic tape comprising a non-magnetic substrate having a thickness of 4 µm or less runs at a high speed, the frictional contact between the cut edge of the magnetic tape and the flange portion of the guide roller becomes less, the flaking from the magnetic tape can be reduced, and the linear running performance of the magnetic tape can be ensured. When the center line average height (Ra) is smaller than 0.08 µm, the smoothness of the cut edge of the magnetic tape becomes better, while the friction coefficient of the cut edge to the flange portion of the guide roller tends to increase, and consequently, it becomes difficult to ensure the linear running performance of the magnetic tape, when the non-magnetic substrate thereof is thin and thus is liable to deform. On the other hand, when the center line average height (Ra) is larger than 0.25 µm, the friction coefficient of the cut edge of the magnetic tape to the flange portion of the guide roller decreases, while there occurs local stress concentration on the raised portions of the cut edge of the magnetic tape, with the result that flaking from the magnetic tape is more likely to occur. Hitherto, it has not been proposed that, by restricting the roughness of the cut edges of a magnetic tape as specified above, a magnetic tape can be provided, which has a thin non-magnetic substrate and which can achieve linear running performance and also can reduce flaking therefrom when it is fed in a linear serpentine type magnetic recording-reproducing system. In this regard, the center line average height (Ra) along the roughness curve of the cut edge of the magnetic tape is a value which is determined based on the measurement with a laser microscope.

Next, a preferable process for producing a magnetic tape having the above-described cut edges will be concretely described.

Figure 3:
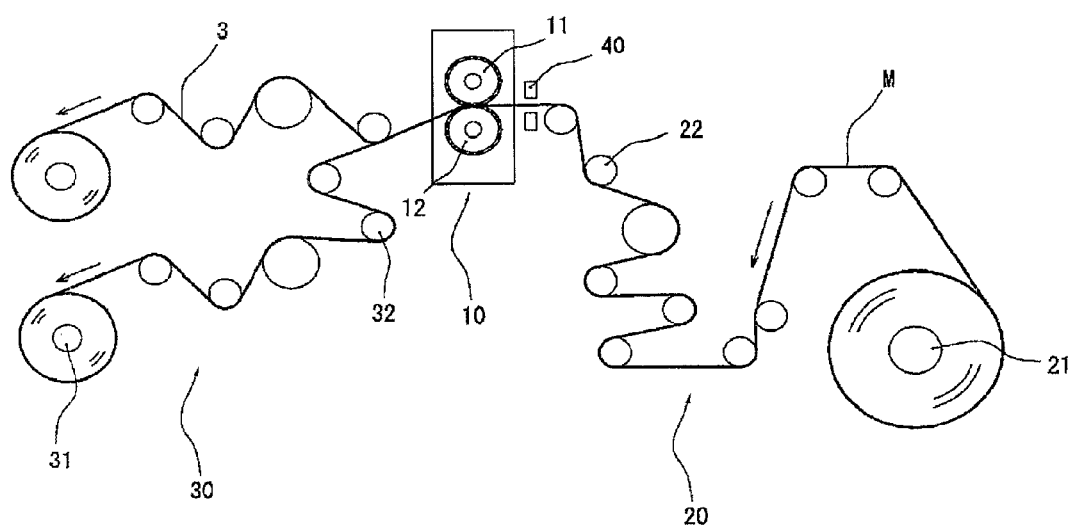
FIG. 3 shows a schematic diagram of a cutting device for use in the production of the magnetic tape according to the present invention.
Figure 4:
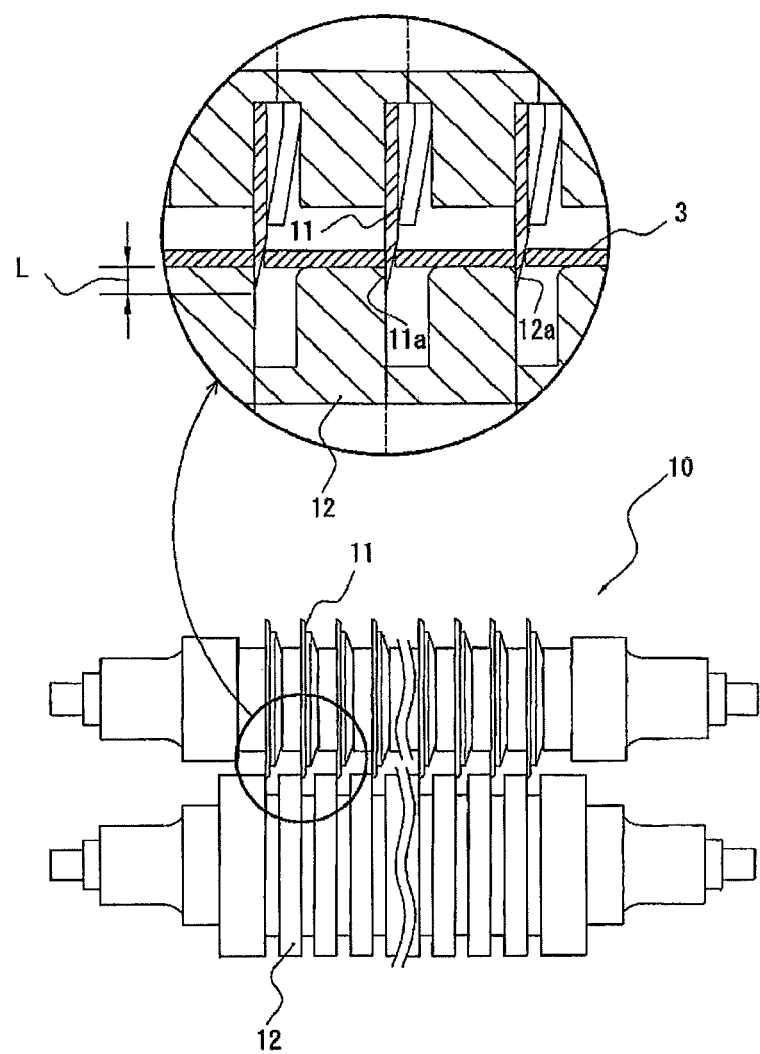
FIG. 4 shows a schematic diagram of the cutting means shown in FIG. 3, and an enlarged view of the essential part thereof.

FIG. 3 shows the schematic diagram of an example of a cutting device for use in the production of a magnetic tape according to the embodiment of the present invention. FIG. 4 shows the front view of the cutting means shown in FIG. 3, illustrating the structure thereof, and also shows the enlarged view of the essential portion thereof As shown in FIG. 3, the cutting device comprises a feeding section 20 which includes a cutting means 10 for cutting a magnetic sheet M into tapes with predetermined widths, a feeding roll 21 onto which the magnetic sheet M is wound, and a plurality of conveyer rollers 22 for conveying the magnetic sheet M from the feeding roll 21 to the cutting means 10; and a take-up section 30 which includes a take-up roll 31 for taking up a magnetic tape 3, and a plurality of conveyer rollers 32 for conveying the magnetic tape 3 cut from the magnetic sheet, from the cutting means 10 to the take-up roll 31. The number of the take-up sections 30 may be increased corresponding to the number of the magnetic tapes 3 cut from the magnetic sheet M.

As shown in FIG. 4, the cutting means 10 comprises upper rotatable thin blades 11 and lower rotatable thick blades 12 which are located confronting each other so as to intermesh with each other at a predetermined intermeshing depth (L). When the magnetic sheet M is cut, the thin blades 11 and the thick blades 12 are synchronously rotated by a rolling mechanism comprising a motor (not shown), etc., while the side faces 11a of the thin blades 11 being pushed against the side faces 12a of the thick blades 12. The velocities of the tip ends of the thin blades 11 and the thick blades 12 are so controlled as to be substantially equivalent to the feeding speed of the magnetic sheet M conveyed from the feeding section 20 to the cutting means 10.

It is necessary to select the cutting conditions for cutting the magnetic sheet M by the use of the above-described cutting device so that the shear forces from both the blades 11 and 12 can be efficiently applied to the magnetic sheet M which is kept unmovable as much as possible. In other words, it is necessary to control a web tension with the feeding roll 21, the take-up roll 31 and the conveyer rollers 22 and 32 so as to efficiently apply the shear forces from both the blades 11 and 12 to the magnetic sheet M, when the magnetic sheet M is cut. However, the following problem arises when a thin non-magnetic substrate is used in the magnetic sheet: that is, because of .its poor mechanical strength, the non-magnetic substrate has low stiffness and it is liable to stretch in the lengthwise direction rather than the widthwise direction, and therefore, it becomes difficult for the magnetic tape to have cut edges with roughness within the above-specified range. According to the present inventors' studies, it has been revealed that a magnetic tape having cut edges with center line average heights (Ra) within the above-specified range can be obtained by satisfying the following four conditions.

The first condition is to use a magnetic sheet M having isotropic elasticity, in which the ratio $Ew/Et$ of the Young's modulus in the widthwise direction (Ew) to the Young's modulus in the lengthwise direction (Et) is from 0.85 to 1.15. When the ratio $Ew/Et$ is outside the above-specified range, the elasticity of the magnetic sheet becomes anisotropic, and thus, the magnetic sheet largely stretches in one direction and thus is apt to fluctuate while being conveyed.

The second condition is to adjust the intermeshing depth (L) of the thin blades 11 and the thick blades 12 within a range of from 0.05 to 0.1 mm. When the intermeshing depth (L) is outside the above-specified range, the magnetic tape 3 tends to stretch in one direction, and the smoothness of the cut edges of the magnetic tape tends to degrade.

The third condition is to use the thin blades 11 and the thick blades 12 which satisfy the following condition: the maximum surface roughness (P-V) of each of the side faces 11a and the side faces 12a at which the thin blades 11 and the thick blades 12 intermesh with each other is 0.05 μm or less. When the maximum roughness (P-V) of each of the side faces 11a and the side faces 12a is outside this range, the cut edges of the magnetic tape tend to crack, and the smoothness thereof tends to degrade. In this regard, the maximum surface roughness (P-V) indicates the distance between the maximum peak and the maximum valley within the measured range of the roughness curve found when the side face of each blade is optically evaluated.

The fourth condition is to constantly maintain the fluctuation of the magnetic sheet M in the widthwise direction at 100 μm or less in the proximity of the cutting means 10, by controlling the web tension of the magnetic sheet M. When a high web tension is applied to the magnetic sheet during the cutting step, the magnetic sheet is liable to snake and is cut while being drawn in the lengthwise direction. Consequently, the cutting condition differs between the largely drawn portion of the magnetic sheet and the poorly drawn portion thereof. When a continuous magnetic tape is produced, it becomes difficult to restrict the center line average height (Ra) within the center line above-specified range over the entire length of the magnetic tape, accordingly. In this regard, the fluctuation of the magnetic sheet can be detected with a detecting means 40 such as an edge position control (EPC) which is disposed in the proximity of the cutting means 10.

Next, the components such as a non-magnetic substrate and a magnetic layer suitable for use in the magnetic tape of the present invention will be described in detail.

As the non-magnetic substrate, a thin polymeric resin film with a thickness of 4 μm or less is used for increasing the mass storage capacity. The thinner the non-magnetic substrate, the more preferable it is. However, it is difficult for the non-magnetic substrate to have a uniform thickness, if the thickness of the non-magnetic substrate is too thin. Thus, the thickness of the non-magnetic substrate is preferably at least 1 μm. Specific examples of such a non-magnetic substrate include a polyamide film, a polyamide film, etc. To produce the magnetic sheet with the above-described Young's moduli isotropic in the lengthwise and widthwise directions, preferably, the non-magnetic substrate has a Young's modulus of from 8 to 20 GPa in the widthwise direction and a Young's modulus of from 9 to 22 GPa in the lengthwise direction.

The magnetic layer comprises magnetic powder and a binder. Specific examples of the magnetic powder include ferromagnetic iron oxide magnetic powder, cobalt-containing ferromagnetic iron oxide magnetic powder, hexagonal ferrite magnetic powder, ferromagnetic metallic iron magnetic powder, iron nitride magnetic powder, etc. Among those, hexagonal system ferrite magnetic powder and iron nitride magnetic powder are preferable, and iron nitride magnetic powder are most preferable, since a magnetic layer with Young's moduli small in anisotropy can be formed therefrom. Such iron nitride magnetic powder is described in detail in, for example, JP-A-2004-273094.

The binder of the magnetic layer may be a conventional thermoplastic or thermosetting resin. Specific examples of the thermoplastic resin include polymers or copolymers, any of which contains, as a constitutive unit, vinyl chloride, vinyl acetate, vinyl alcohol, maleic acid, acrylic acid, acrylic ester, vinylidene chloride, acrylonitrile, methacrylic acid, methacrylic ester, styrene, butadiene, ethylene, vinyl butyral, vinyl acetal, vinyl ether or the like. Specific examples of the thermosetting resin include phenol resins, epoxy resins, polyurethane resins, urea resins, melamine resins, alkyd resins, etc. The content of any of these binders for use in the magnetic layer is preferably from 5 to 50 parts by weight per 100 parts by weight of the magnetic powder.

The binder may be used in combination with a thermo-curing crosslinking agent which is bonded to functional groups, etc. in the binder to form a crosslinked structure. Specific examples of the crosslinking agent are isocyanate compounds such as tolylenediisocyanate, hexamethylenediisocyanate and isophoronediisocyanate; reaction products of isocyanate compounds with compounds each having a plurality of hydroxyl groups, such as trimethylolpropane, etc.; and polyisocyanates such as condensation products of isocyanate compounds. The crosslinking agent is used usually in an amount of from 10 to 50 parts by weight per 100 parts by weight of the binder.

The magnetic layer may contain an additive or additives such as carbon black, a lubricant and non-magnetic powder in order to improve the electric conductivity, surface smoothness and durability thereof. Specifically, acetylene black, furnace black or thermal black is used as carbon black. The content of carbon black is preferably from 0.2 to 5 parts by weight per 100 parts by weight of the magnetic powder. Specific examples of the lubricant include fatty acids, fatty acid esters and fatty acid amides, each having 10 to 30 carbon atoms. The content of the lubricant is preferably from 0.2 to 3 parts by weight per 100 parts by weight of the magnetic powder. Specific examples of the non-magnetic powder include alumina, silica, etc. The content of the non-magnetic powder is preferably from 1 to 20 parts by weight per 100 parts by weight of the magnetic powder.

The thickness of the magnetic layer is preferably 300 nm or less, more preferably from 10 to 300 nm, still more preferably from 10 to 250 nm, most preferably from 10 to 200 nm, from the viewpoint of higher recording density. When the thickness of the magnetic layer exceeds 300 nm, reproduction output tends to decrease due to thickness loss. When the thickness of the magnetic layer is smaller than 10 nm, the magnetic layer is hard to have uniformity in thickness. Preferably, the Young's modulus of the magnetic layer in the widthwise direction is from 4 to 10 GPa, and the Young's modulus thereof in the lengthwise direction is from 4 to 9 GPa.

When the magnetic sheet is produced, the above-described magnetic powder and binder and optionally other additives are mixed in a solvent to prepare a magnetic coating composition, this magnetic coating composition is applied to the non-magnetic substrate, and the applied magnetic coating layer is oriented and dried to provide the magnetic sheet. As the solvent, any of the organic solvents used for the preparation of the conventional magnetic coating compositions may be used. Specific examples of the solvent include cyclohexanone, toluene, methyl ethyl ketone, tetrahydrofuran, etc. For the preparation of the magnetic coating composition, any of the coating composition-preparing methods employed for the production of the conventional magnetic recording media may be employed. Particularly preferable is a method comprising a kneading step with the use of a kneader, in combination with a primary dispersing step. In the primary dispersing step, a sand mill is preferably used, since the dispersibility of the coating composition is improved, and since the surface properties of the magnetic layer can be controlled.

The magnetic tape of the present invention may have at least one primer layer containing inorganic powder and a binder between the non-magnetic substrate and the magnetic layer. The thickness of the primer layer is preferably from 0.1 to 3.0 mm, more preferably from 0.15 to 2.5 µm. Particularly preferable is the primer layer containing inorganic powder which comprises acicular inorganic particles having an average major axial length of from 30 to 100 nm, and an average axis ratio of from 2 to 4. The formation of the primer layer containing such acicular inorganic particles is effective to impart stiffness to the magnetic sheet and to improve the cutting property of the magnetic sheet. Examples of such inorganic powder include non-magnetic powders such as iron oxide and alumina, and magnetic powders such as y-iron oxide, Co-y-iron oxide, magnetite, chromium oxide, Fe—Ni alloys, Fe—Co alloys and Fe—Ni—Co alloys. Each of these inorganic powders may be used alone, or two or more of them may be used as a mixture.

As the binder of the primer layer, there may be used any of the same thermoplastic and thermosetting resins as those exemplified as the binders of the magnetic layer. More preferably, there is used an electron radiation curing resin which releases a radical when exposed to an electron ray and which has at least one unsaturated double bond in the molecule curable by crosslinking or polymerization. Generally, the primer layer is thicker than the magnetic layer in a high recording density magnetic tape, and therefore, the rigidity of the primer layer dominantly affects the rigidity of the magnetic sheet. If the primer layer contains the electron radiation curing resin superior in rigidity to the thermoplastic and thermosetting resin as the binder, it effectively improves the stiffness of the magnetic sheet to improve the cutting property of the magnetic sheet. The content of the binder contained in the primer layer is preferably from 7 to 50 parts by weight, more preferably from 10 to 35 parts by weight, per 100 parts by weight of the inorganic powder.

Examples of the electron radiation curing resin are the following resins, each of which is modified to have electron radiation sensitivity by introducing a (meth)acrylic double bond therein in a known manner: that is, such resins are vinyl chloride resins and polyurethane resins, (meth)acrylic resins, polyester resins, acrylonitrile-butadiene copolymers, polyamide resins, polyvinylbutyral, nitrocellulose, styrene-butadiene copolymers, polyvinyl alcohol resins, acetal resins, epoxy resins, phenoxy resins, polyether resins, polyfunctional polyethers such as polycaprolactone, polyamide resins, phenol resins, polybutadiene elastomers, chlorinated rubber, acrylic rubber, isoprene rubber and epoxy-modified rubber. Preferable among those is an electron radiation curing resin which is obtained by using a vinyl chloride resin or a polyurethane resin as a starting material, and modifying such a starting material with a compound having an isocyanate group and a radical polymerizable unsaturated double bond in the molecule, under an atmosphere having a specified moisture content, so as to impart electron radiation sensitivity to the starting material.

To impart electric conductivity and surface lubricity to the magnetic layer, the primer layer preferably contains carbon black and a lubricant. As the carbon black and the lubricant, the same materials as those used for the magnetic layer may be used. The method for preparing a coating composition for the primer layer may be the same method as employed for the magnetic coating composition. When the primer layer is formed, the magnetic coating composition and the primer layer coating composition may be applied by any of the method of sequential application for lamination of layers and the method of concurrent application for lamination of layers (a wet-on-wet method). When the primer layer is formed, preferably, the Young's modulus of the lamination of the magnetic layer and the primer layer in the widthwise direction is from 4 to 10 GPa, and the Young's modulus thereof in the lengthwise direction is from 4 to 9 GPa.

The magnetic tape of the present invention may have a backcoat layer on the other surface of the non-magnetic substrate having the magnetic layer formed on one surface. The thickness of the backcoat layer is preferably from 0.2 to 0.8 µm, more preferably from 0.3 to 0.8 µm. Preferably, the backcoat layer contains carbon black such as acetylene black, furnace black or thermal black. As the binder in the backcoat layer, any of the resins used in the magnetic layer may be used. Preferably, a cellulose resin is used in combination with a polyurethane resin, so as to decrease the friction coefficient of the magnetic tape and to improve the running performance of the magnetic tape. When the backcoat layer is formed, preferably, the Young's modulus of the backcoat layer in the widthwise direction is from 4 to 10 GPa, and the Young's modulus thereof in the lengthwise direction is from 4 to 9 GPa.

The Young's moduli of the entire magnetic sheet in the widthwise and lengthwise directions are not particularly limited, insofar as the ratio of the Young's, moduli in the widthwise and lengthwise directions falls within the ranges specified above. This is because the Young's moduli of the magnetic sheet vary depending on the kind and thickness of the non-magnetic substrate, the composition and thickness of the magnetic layer and the presence or absence of the primer layer and/or the backcoat layer. Preferably, the Young's modulus of the entire magnetic sheet in the widthwise direction is from 4 to 10 GPa, and the Young's modulus thereof in the lengthwise direction, from 4 to 10 GPa.

The magnetic tape of the present invention is produced by cutting the magnetic sheet obtained as above under the cutting conditions described above. Even if the magnetic tape thus obtained contains a thin non-magnetic substrate, it has excellent linear running performance when it is fed at a high speed, and flaking therefrom is reduced. Therefore, it is possible to lengthen this magnetic tape as a continuous one and thus is possible to obtain a mass storage magnetic tape. The thinner the entire thickness of the magnetic tape, the more preferable it is, because a larger storage capacity can be obtained. The entire thickness of the magnetic tape is preferably from 2 to 8 µm, more preferably from 3 to 6 µm.

EXAMPLES

Hereinafter, the present invention will be described in more detail by way of Examples thereof, which should not be construed as limiting the scope of the present invention in any way. In the Examples, "part" means "part by weight", unless otherwise specified.

Preparation of Magnetic Coating Composition (I)

The components of a magnetic coating composition (I) shown in Table 1 below were kneaded with a kneader, the kneaded mixture was dispersed with a sand mill (residence time: 60 minutes), and the resulting liquid dispersion was mixed with polyisocyanate (6 parts), and the mixture was further stirred and filtered to obtain the magnetic coating composition (I).

TABLE 1

| Components of Magnetic Coating Composition (I) | Amount (parts) |
|---|---|
| Fe16N2 phase-containing iron nitride magnetic powder (Y and Al added) (average particle size: 15.5 nm) | 70 |
| Vinyl chloride-hydroxypropyl methacrylate copolymer resin (—SO$_3$Na groups contained: 0.7 × 10$^{-4}$ eq./g) | 15 |
| Polyester polyurethane resin (—SO$_3$Na groups contained: 1.0 × 10$^{-4}$ eq./g) | 9 |
| α-Alumina (average particle size: 80 nm) | 4 |
| Cyclohexanone | 156 |
| Toluene | 156 |

Preparation of Primer Layer Coating Composition (i)

The components of a primer layer coating composition (i) shown in Table 2 below were kneaded with a kneader; the kneaded mixture was dispersed with a sand mill (residence time: 60 minutes) and the resulting liquid dispersion was mixed with dipentaerithritol hexaacrylate (6 parts) as an electron radiation curing resin, and the mixture was further stirred and filtered to obtain the primer layer coating composition (i).

TABLE 2

| Components of Primer Layer Coating Composition (i) | Amount (parts) |
|---|---|
| Acicular iron oxide powder (average major axial length: 90 nm; average axial ratio: 5) | 70 |
| α-Alumina (average particle size: 80 nm) | 10 |
| Carbon black (average particle size: G5 nm) | 20 |
| Vinyl chloride-hydroxypropyl methacrylate copolymer resin (—SO$_3$Na groups contained: 1.0 × 10$^{-4}$ eq./g) | 10 |
| Polyester polyurethane resin (—SO$_3$Na groups contained: 1.0 × 10$^{-4}$ eq./g) | 5 |
| Methyl ethyl ketone | 130 |
| Toluene | 80 |
| Cyclohexanone | 65 |
| Myristic acid | 1 |
| Butyl stearate | 1.5 |

Preparation of Primer Layer Coating Composition (ii)

A primer layer coating composition (ii) was prepared in the same manner as in the preparation of the primer layer coating composition (i), except that no electron radiation curing resin was added.

Preparation of Backcoat Layer Coating Composition

The components of a backcoat layer shown in Table 3 below were dispersed with a sand mill (residence time: 45 minutes), and the resulting liquid dispersion was mixed with polyisocyanate (8.5 parts), and the mixture was stirred and filtered to obtain the backcoat layer coating composition.

TABLE 3

| Composition of Backcoat Layer Coating Composition | Amount (parts) |
|---|---|
| Carbon black (average particle size: 25 nm) | 40 |
| Carbon black (average particle size: 370 nm) | 1 |
| Barium sulfate | 4 |
| Nitrocellulose | 28 |
| Polyurethane resin (—S0$_3$Na groups contained) | 20 |
| Methyl ethyl ketone | 100 |
| Toluene | 100 |
| Cyclohexanone | 100 |

Production of Magnetic Sheet

Each of the non-magnetic substrates shown in Table 4 below was used in combination with the coating compositions shown in Table 5 below. Firstly, the primer layer coating composition (i) or (ii) described above as applied to the non-magnetic substrate so that the resulting primer layer could be 2 μm in thickness after being dried and calendered. Simultaneously with this application, the magnetic coating composition (I) was applied to and superposed on the primer layer so that the resulting magnetic layer could be 100 nm in thickness after being dried and calendered. The primer layer and the magnetic layer were dried while being oriented in the lengthwise direction. Thus, the primer layer and the magnetic layer were formed. In this regard, when the primer layer coating composition (i) containing an electron radiation curing resin as the binder was used, the primer layer and the magnetic layer were exposed to an electron ray of 4 MRad after being dried.

Next, the above-described backcoat layer coating composition was applied to the other surface of the non-magnetic substrate having the magnetic layer formed on one surface, so that the resulting backcoat layer could be 700 nm in thickness after being dried and calendered, and then, the backcoat layer was dried.

The magnetic sheet, which had the primer layer and the magnetic layer on one surface of the non-magnetic substrate and had the backcoat layer formed on the other surface thereof, was specular finished with a five-staged calender (70° C. under a linear pressure of 150 Kg/cm); and the resulting magnetic sheet was wound onto a sheet core, and was aged in this state under an atmosphere of 60° C. and 40% RH for 48 hours.

TABLE 4

| Type | Material | Thickness (μm) | YMu (GPa) | YD2* (GPa) | YD/YM |
|---|---|---|---|---|---|
| A | Aromatic polyamide | 3.1 | 15.2 | 16.0 | 1.05 |
| B | Aromatic polyamide | 3.1 | 13.8 | 15.8 | 1.14 |
| C | Aromatic polyamide | 3.1 | 15.9 | 13.9 | 0.87 |
| D | Aromatic polyamide | 3.1 | 15.9 | 13.0 | 0.82 |
| E | Aromatic polyamide | 3.1 | 13.1 | 15.9 | 1.21 |
| F | Aromatic polyamide | 2.2 | 15.2 | 16.0 | 1.05 |

Notes:
1) YD: Young's modulus in widthwise direction
2) YM: Young's modulus in lengthwise direction The Young's moduli of the magnetic sheet thus obtained in the lengthwise and widthwise directions were calculated under the following conditions.

Young's Modulus

A tensile tester equipped with a precision displacement meter was used to pull a test sample in the shape of a ½ inch square, and a Young's modulus was calculated from the elongation of the test sample found when the distortion thereof was 0.3%.

Next, the magnetic sheet was cut into a tape with a width of ½ inch under the cutting conditions shown in Tables 5 and 6, using the cutting device shown in FIG. 3. Thus, the magnetic tape was obtained. In this regard, an edge position control (or EPC) was disposed in the proximity of the cutting means so as to adjust the fluctuation of the magnetic sheet in the widthwise direction, so that the web tension could be changed with the use of the feeding roll, the take-up roll and the adjusting rollers, to adjust the fluctuation of the magnetic sheet in the widthwise direction.

The resultant magnetic tape was evaluated in the center line average height (Ra) and friction coefficient of the cut edge thereof, and was also evaluated in linear miming performance and flaking therefrom. The results are shown in Tables 5 and 6.

Center Line Average Height (Ra) of Cut Edge

The cut edges of the magnetic tape were fixed with a jig, and the roughness curve of the cut edge thereof was measured with a laser microscope [i.e., a real time scan type laser microscope 1LM21D with a He—Ne laser, CW type (wavelength: 632.8 nm, and maximum output: 0.1 mW), manufactured by Lasertec], under the following measuring conditions:

Magnification of the microscope: 1,000
Resolution: 0.3 μm
Number of times of slow scanning: 8
Scanning time: 40 seconds.

A roughness curve was obtained from 10 points on the cut edge of sample, and the data of the resultant roughness curve were processed to find a center line average height (Pa).

Friction Coefficient

An evaluation apparatus comprising guide rollers (made of SUS) for LTO and tension gauges at its both ends was used. The magnetic tape was wound onto the upper flange of the guide roller at an angle of 0.5 degree thereto, and was fed at a rate of 1.2 m/ruin. A friction coefficient of the magnetic tape was calculated from a difference between the tensions found from the tension gauges at both ends of the apparatus.

Linear Running Performance

The magnetic tape was set in a LTO cartridge, and this LTO cartridge was loaded on a LTO drive. Then, the magnetic tape was fed in a shuttle mode (simple feeding at a tape speed of 6 m/sec. without recording or reproducing).

The running performance of the magnetic tape fed in frictional contact with the guide roller in the drive was visually observed. The linear running performance of the magnetic tape was evaluated based on the following criteria:

A: no vibration of the tape edge
B: vibration of the tape edge
C: bending of the tape edge Flaking The magnetic tape was set in a LTO cartridge, and this LTO cartridge was loaded on a LTO drive, and 2,000 passes of feeding of the magnetic tape was performed in a shuttle mode (tape speed: 6 m/sec.). After completion of the feeding, dirt on the flange portion of the guide roller was visually observed, and the flaking from the magnetic tape was evaluated based on the following criteria:

A: no remarkable flaking
B: blackish discoloration of the flange portion
C: black powdery dirt on the flange portion

TABLE 5

| | | | Ex. 1 | Ex. 2 | Ex. 3 | Ex. 4 | Ex. 5 |
|---|---|---|---|---|---|---|---|
| Non-magnetic substrate | | Type | A | B | C | F | A |
| Magnetic coating composition | | Type | I | I | I | I | I |
| Primer layer coating composition | | Type | I | i | i | i | ii |
| Magnetic sheet | Ew | (GPa) | 15.5 | 15.2 | 13.4 | 15.7 | 15.3 |
| | Et | (GPa) | 14.7 | 13.3 | 15.4 | 14.9 | 14.5 |
| | Ew/Et | | 1.05 | 1.14 | 0.87 | 1.05 | 1.05 |
| | Entire thickness | (μm) | 4.4 | 4.4 | 4.4 | 3.4 | 4.4 |
| Cutting conditions | Intermeshing depth (L) | (μm) | 0.08 | 0.08 | 0.07 | 0.08 | 0.08 |
| | Surface roughness Thin blade (P-V) | (μm) | 0.04 | 0.04 | 0.02 | 0.04 | 0.04 |
| | Thick blade | (μm) | 0.03 | 0.04 | 0.02 | 0.03 | 0.03 |
| | Movement in width-wise direction | (μm) | 80 | 72 | 89 | 88 | 85 |
| Evaluation | Center line average Height (Ra) | (μm) | 0.11 | 0.09 | 0.23 | 0.15 | 0.12 |
| | Friction coefficient | | 0.29 | 0.31 | 0.17 | 0.25 | 0.18 |
| | Linear running performance | | A | B | A | B | A |
| | Flaking | | A | A | B | B | B |

TABLE 6

| | | | C. Ex. 1 | C. Ex. 2 | C. Ex. 3 | C. Ex. 4 | C. Ex. 5 | C. Ex. 6 |
|---|---|---|---|---|---|---|---|---|
| Non-magnetic substrate | | Type | D | E | A | A | A | A |
| Magnetic coating composition | | Type | I | I | I | I | T | I |
| Primer layer coating composition | | Type | i | i | i | i | i | i |
| Magnetic sheet | Ew | (GPa) | 12.5 | 15.4 | 15.5 | 15.5 | 15.5 | 15.5 |
| | Et | (GPa) | 15.4 | 12.6 | 14.7 | 14.7 | 14.7 | 14.7 |
| | Ew/Et | | 0.81 | 11.2 | 1.05 | 1.05 | 1.05 | 1.05 |
| | Entire thickness | (μm) | 4.4 | 4.4 | 4.4 | 4.4 | 4.4 | 4.4 |
| Cutting conditions | Intermeshing depth (L) | (μm) | 0.07 | 0.08 | 0.04 | 0.11 | 0.08 | 0.08 |
| | Surface roughness Thin blade (P-V) | (μm) | 0.02 | 0.04 | 0.04 | 0.04 | 0.06 | 0.04 |
| | Thick blade | (μm) | 0.02 | 0.04 | 0.03 | 0.03 | 0.06 | 0.03 |
| | Movement in width-wise direction | (μm) | 70 | 105 | 81 | 81 | 84 | 105 |
| Evaluation | Center line average height (Ra) | (μm) | 0.06 | 0.27 | 0.07 | 0.27 | 0.27 | 0.31 |
| | Friction coefficient | | 0.34 | 0.13 | 0.33 | 0.13 | 0.13 | 0.09 |
| | Linear running performance | | C | A | C | A | A | A |
| | Flaking | | A | C | A | C | C | C |

As can be seen from the results in Tables 5 and 6, a magnetic tape with a cut edge having a center line average height (Ra) of from 0.08 to 0.25 μm can be produced by cutting a magnetic sheet in which the ratio of the Young's modulus in the widthwise direction (Ew) to the Young's modulus in the lengthwise direction (Et), i.e., Ew/Et, is from 0.85 to 1.15, using the following cutting means, while fluctuation of the magnetic sheet in the widthwise direction being kept to 100 μm or less. The cutting means comprises thin blades and thick blades, wherein the intermeshing depth (L) of the thin blades and the thick blades is from 0.05 to 0.1 mm, and the maximum surface roughness (P-V) of any of the side faces of the thin blades and the thick blades at which both the blades are intermeshed with each other is 0.05 μm or less. It is also known that a magnetic tape which has a center line average height (Ra) within this specified range shows a smaller friction coefficient at its cut edge to the flange portion of a guide roller. Therefore, such a magnetic tape is superior in linear running performance. It is also known that flaking from the magnetic tape having the above-specified center line average height (Ra), fed at a high speed on the flange portions of guide rollers, is reduced. It is further known that a magnetic tape which includes a primer layer containing an electron radiation curing resin is further decreased in friction coefficient and flaking therefrom, as compared with a magnetic tape which includes a primer layer containing a therplastic resin or a thermosetting resin alone. It is considered that the use of the electron radiation curing resin as a binder is effective to improve the cutting property of the magnetic sheet.

In contrast, a magnetic tape having a center line average height (Ra) of less than 0.08 μm is reduced in flaking therefrom. However, this magnetic tape shows a larger friction coefficient at its cut edge to the flange portion of a guide roller and thus lowers in linear running performance. It is considered that this is because the cut edge of the magnetic tape is excessively smoothened to increase the contact area between the cut edge of the magnetic tape and the flange portion of the guide roller. On the other hand, a magnetic tape having a center line average height (Ra) of more than 0.25 μm is decreased in friction coefficient, but is increased in flaking therefrom. It is considered that this is because too rough a cut edge of the magnetic tape would locally strike at its raised portions against the flange portion of a guide roller.

What is claimed is:

1. A magnetic tape having an entire thickness of from 2 μm to 8 μm produced by cutting a magnetic sheet with a wide breadth into a tape with a predetermined width using a cutting device, wherein the magnetic sheet comprises a magnetic layer with a thickness of 10 to 300 nm containing magnetic powder and a binder formed on one surface of a non-magnetic substrate, and a primer layer comprising inorganic powder and a binder having a thickness of 0.1 μm to 3.0 μm between said magnetic layer and said non-magnetic substrate, and wherein a center line average height (Ra) along a roughness curve of a cut edge of the magnetic tape in a thickness direction is from 0.09 to 0.23 μm.

2. The magnetic tape according to claim 1, wherein the center line average height (Ra) along a roughness curve of a cut edge of the magnetic tape in a thickness direction is from 0.09 to 0.12 μm.

3. The magnetic tape according to claim 1, wherein said binder of said primer layer contains an electron radiation curing resin.

4. The magnetic tape according to claim 1, wherein a friction coefficient between a cut edge of the magnetic tape and a flange portion of a guide roller is from 0.18 to 0.31.

* * * * *

UNITED STATES PATENT AND TRADEMARK OFFICE
CERTIFICATE OF CORRECTION

PATENT NO. : 9,443,546 B2
APPLICATION NO. : 14/147339
DATED : September 13, 2016
INVENTOR(S) : Tetsutaro Inoue Page 1 of 1

It is certified that error appears in the above-identified patent and that said Letters Patent is hereby corrected as shown below:

In the Specification

Column 9, Line 12, change "3.0 mm," to --3.0 µm,--.

Signed and Sealed this
Twenty-eighth Day of May, 2019

Andrei Iancu
*Director of the United States Patent and Trademark Office*